United States Patent [19]

Peev et al.

[11] Patent Number: 4,750,187

[45] Date of Patent: Jun. 7, 1988

[54] GRAPHITIC ELECTRODE WITH PROTECTIVE COATING

[75] Inventors: Vassil G. Peev; Maksim O. Tzonevski, both of Sofia, Bulgaria

[73] Assignee: N P P PO Elektrotermia, Sofia, Bulgaria

[21] Appl. No.: 764,940

[22] Filed: Aug. 12, 1985

[51] Int. Cl.$^4$ .......................... H05B 7/06; H05B 7/08
[52] U.S. Cl. ...................................................... 373/88
[58] Field of Search .......................... 373/88, 64, 95; 106/287.17, 286.5

[56] References Cited

U.S. PATENT DOCUMENTS

| | | | |
|---|---|---|---|
| 3,348,929 | 10/1967 | Valtschev et al. | 373/88 |
| 3,476,586 | 11/1969 | Valtschev et al. | 373/88 |
| 3,553,010 | 1/1971 | Rubisch et al. | 373/88 |
| 4,252,856 | 2/1981 | Sara | 373/88 |
| 4,383,321 | 5/1983 | Schieber et al. | 373/88 |
| 4,530,853 | 7/1985 | Lewallen et al. | 373/88 |

*Primary Examiner*—Roy N. Envall, Jr.
*Attorney, Agent, or Firm*—Klein and Vibber

[57] ABSTRACT

The protective coating consists of three layers. As alloying additives in the first and second layer or only in the second layer are used, nickel and iron or their oxides whereby the nickel content is from 0.05 to 0.95% and the iron content is, respectively, from 0.1 to 15% with regard to the total amount of aluminum. Both layers are submitted to heat treatment with surface density of the heat flow from 8 to $16.10^6$ W/m$^2$. The third layer consists of aluminum with technical grade purity.

The thus described graphitic electrodes are used in arc furnaces.

4 Claims, 1 Drawing Sheet

GRAPHITIC ELECTRODE WITH PROTECTIVE COATING

This invention relates to graphitic electrodes which are provided with a protective coating, such electrodes being used in arc furnaces.

Protective coatings for graphitic electrodes having one or more protective layers, and the method for forming same, are described in Bulgarian Authorship Certificate No. 11,029, 02.09.1965. In accordance with this method, the separate layers of the coatings are formed by electric arc treatment of a metallized aluminium layer on which there is deposited a mixture of alloying additives. In accordance with Bulgarian Authorship Certificate No. 136, 01.12.1960, these alloying additives contain silicon carbide, titanium dioxide, boric acid, and aluminium in powder form.

The disadvantage of the described prior art coating is their relatively low corrosion resistance at a temperature of 1550° C. in an oxidizing medium.

The invention has among its objects the provision of a coating on graphitic electrodes with higher corrosion resistance than the corrosion resistance of existing coatings on such electrodes at a temperature of 1600° C. in the atmosphere.

This object is achieved by a protective coating consisting of three layers and formed according to the method described in (1). As alloying additives kin the first and second layer or only in the second layer are used nickel and iron or their oxides whereby the content of nickel is in the range from 0.05% to 0.95% and of iron in the range from 0.1% to 15% with regard to the total amount of aluminium. Both layers are submitted to a heat treatment with a surface density of the heat flow 8 to $16.10^6$ W/m$^2$.

The third layer consists of aluminium with technical grade purity.

The thus formed multi-layer coating exhausts its protective properties at a temperature of 1600° C. in the atmosphere after 11 to 14 hours. By way of contrast, the described known coatings under the same conditions exhaust their protective properties after only 4 to 5 hours.

BRIEF DESCRIPTION OF THE DRAWING

With these and other objects in view, which will become apparent in the following examples, the present invention, which is shown by example only, will be clearly understood in connection with the accompanying drawing, in which.

The invention is illustrated by the following examples.

EXAMPLE 1

Figure 1:
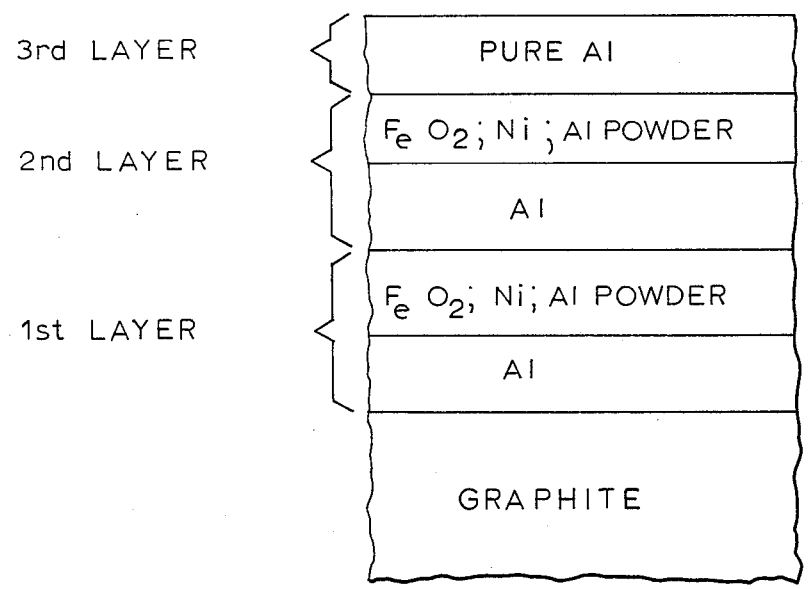
FIG. 1 is a schematic cross section view of the coating of Example 1.
Figure 2:
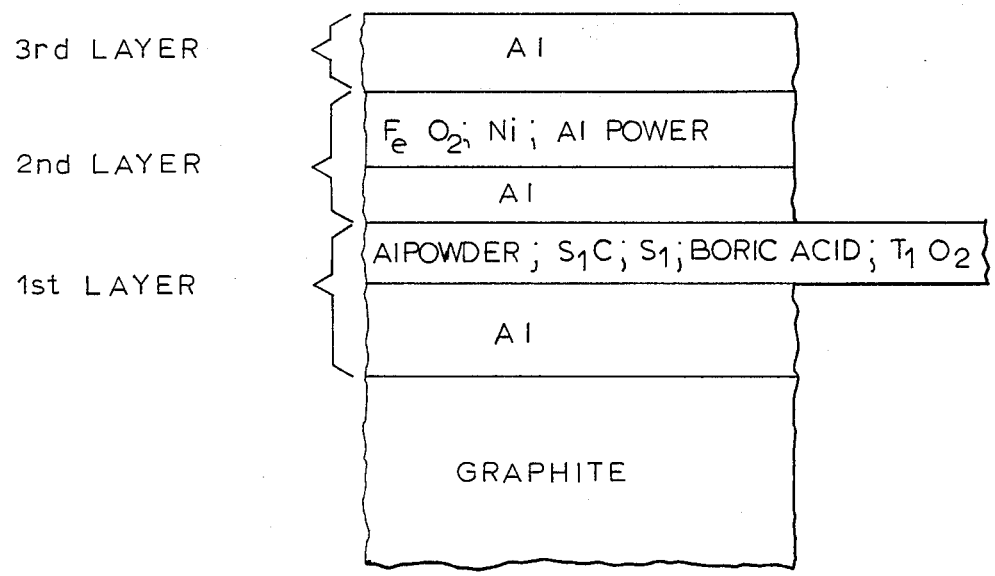
FIG. 2 is a schematic cross section view of the coating of Example 2.

On the surface of a graphitic electrode there was applied by metallization, a first layer consisting of aluminium with a technical grade purity in an amount of 700 g/m$^2$. Over such first layer of aluminium there was applied a blend with the following content: 35 g/m$^2$ iron oxide, 10 g/m$^2$ nickel, and 18 g/m$^2$ aluminium powder. This was followed by heat treatment with a surface density of the heat flow of $12.10^6$ W/cm$^2$. These two coatings comprise the first of three layers, said first layer being an alloy Al-Fe-Ni. A second layer was formed in the same manner as the first layer, said second layer being treated in exactly the same manner as the first layer. Finally, there was applied a third layer of pure aluminum in the amount of 1150 g/m$^2$ by metallization, and then the surface was polished by a wire brush.

EXAMPLE 2

On the surface of a graphitic electrode there was applied by metallization a first layer of aluminium technical grade purity in the amount of 590 g/m$^2$. Over it there was applied a blend containing 57 g/m$^2$ aluminium powder, 60 g/m$^2$ silicon carbide, 64 g/m$^2$ silicon, 38 g/m$^2$ boric acid, and 74 g/m$^2$ titanium dioxide. These two coatings form the first layer which was heat treated with a surface density of the heat flow of $8.10^6$ W/m$^2$. Thus the first layer is an alloy Al-Si-Ti-B. Following this, a second layer of aluminium applied by metallization in an amount of 850 g/m$^2$ was applied over the first layer. Over such aluminium coating there was applied a blend containing 80 g/m$^2$ iron oxide, 12 g/m$^2$ nickel, and 20 g/m$^2$ aluminium powder. This was followed by heat treatment with a surface density of the heat flow of $15.10^6$ W/m$^2$. Thus the second layer is an alloy Al-Ni-Fe. Finally, a third layer composed of aluminium was applied by metallization in an amount of 1100 g/m$^2$ is applied to the previously applied coatings on the electrode; the outer surface of the last applied aluminium coating was polished by a wire brush.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. A graphitic electrode having a protective coating, said coating comprising a first, second and third layer;
    said first and second layer each being an alloy consisting of metallized aluminium and a blend containing aluminium powder, silicon carbide, silicon, titanium dioxide and boric acid;
    said first and second layers being treated by electric arc;
    said third layer consisting of pure aluminium; and
    said first and second layers containing from 0.5 to 0.95% nickel and from 0.1% to 15% iron with regard to the total amount of aluminum.

2. A graphitic electrode having a protective coating electrodes as claimed in claim 1, wherein the first and the second layers are heat treated with a surface density of the heat from $8 \times 10^6$ to $16 \times 10^6$ W/m$^2$.

3. A graphitic electrode having a protective coating, said coating comprising a first, second and third layer;
    said first and second layer each being an alloy consisting of metallized aluminium and a blend of aluminium powder, silicon carbide, silicon, titanium dioxide and boric acid;
    said first and second layers being treated by electric arc;
    said third layer consisting of pure aluminium; and
    said second layer containing from 0.5 to 0.95% nickel and from 0.1% to 15% iron with regard to the total amount of aluminum.

4. A graphitic electrode having a protective coating as claimed in claim 3, wherein the first and the second layers are heat treated with a surface density of the heat from $8 \times 10^6$ to $16 \times 10^6$ W/m$^2$.

* * * * *